United States Patent

Domas et al.

[11] Patent Number: 5,860,723
[45] Date of Patent: Jan. 19, 1999

[54] LIGHT ENGINE WITH ELIPSOIDAL REFLECTOR

[75] Inventors: Ben V. Domas, Oakland; Alvin D. McCauley, Holly, both of Mich.

[73] Assignee: Transmatic, Inc., Waterford, Mich.

[21] Appl. No.: 843,249

[22] Filed: Apr. 14, 1997

[51] Int. Cl.$^6$ ............... F21V 7/08; F21V 7/20; F21V 8/00
[52] U.S. Cl. ............ 362/32; 362/294; 362/305; 362/345; 362/346
[58] Field of Search ............ 362/32, 294, 297, 362/298, 300, 302, 304, 305, 345, 346, 373

[56] References Cited

U.S. PATENT DOCUMENTS

| | | | |
|---|---|---|---|
| 3,446,952 | 5/1969 | Sitter et al. | 362/32 |
| 3,455,622 | 7/1969 | Cooper | 359/359 |
| 3,681,592 | 8/1972 | Hugelshofer | 362/32 |
| 3,770,338 | 11/1973 | Helmuth | 385/88 |
| 4,106,078 | 8/1978 | Inoue | 362/32 |
| 4,281,366 | 7/1981 | Wurster et al. | 362/32 |
| 4,321,659 | 3/1982 | Wheeler | 362/293 |
| 4,460,939 | 7/1984 | Murakami et al. | 362/31 |
| 4,496,211 | 1/1985 | Daniel | 385/31 |
| 4,704,660 | 11/1987 | Robbins | 362/32 |
| 4,747,660 | 5/1988 | Nishioka et al. | 385/31 |
| 4,786,127 | 11/1988 | Molnar | 385/52 |
| 4,860,172 | 8/1989 | Schlager et al. | 362/32 |
| 4,883,333 | 11/1989 | Yanez | 385/33 |
| 4,887,190 | 12/1989 | Sadamune et al. | 362/32 |
| 4,907,133 | 3/1990 | Nath | 32/32 |
| 4,922,385 | 5/1990 | Awai | 362/32 |
| 4,986,622 | 1/1991 | Martinez | 385/16 |
| 5,099,399 | 3/1992 | Miller et al. | 362/32 |
| 5,117,312 | 5/1992 | Dolan | 359/858 |
| 5,170,454 | 12/1992 | Kanai | 385/88 |
| 5,271,077 | 12/1993 | Brockman et al. | 385/33 |
| 5,317,484 | 5/1994 | Davenport et al. | 362/32 |
| 5,321,586 | 6/1994 | Hege et al. | 362/32 |
| 5,335,648 | 8/1994 | Kozawa et al. | 600/181 |
| 5,416,669 | 5/1995 | Kato et al. | 362/32 |
| 5,515,242 | 5/1996 | Li | 362/298 |

Primary Examiner—Alan Cariaso
Attorney, Agent, or Firm—Reising, Ethington, Learman & McCulloch, PLLC

[57] ABSTRACT

A light engine including a lamp casing having a tubular light pipe receptacle. A large core optic light pipe extends from outside the light engine into the tubular receptacle. The light pipe has an inner end supported in the tubular receptacle. Two half-ellipsoidal reflector dishes are joined to form a single ellipsoidal reflector within the casing. A lamp is supported within the casing adjacent a first focal point of the ellipsoidal reflector. The reflector is positioned to focus light energy from the lamp onto a second focal point of the ellipsoidal reflector. A quartz thermal barrier is disposed in the tubular receptacle between the lamp and the light pipe inner end. The thermal barrier has an outer end surface optically coupled to the light pipe and an inner end surface disposed adjacent the second focal point of the reflector to receive convergent light emitted from the lamp and reflected from the reflector.

11 Claims, 2 Drawing Sheets

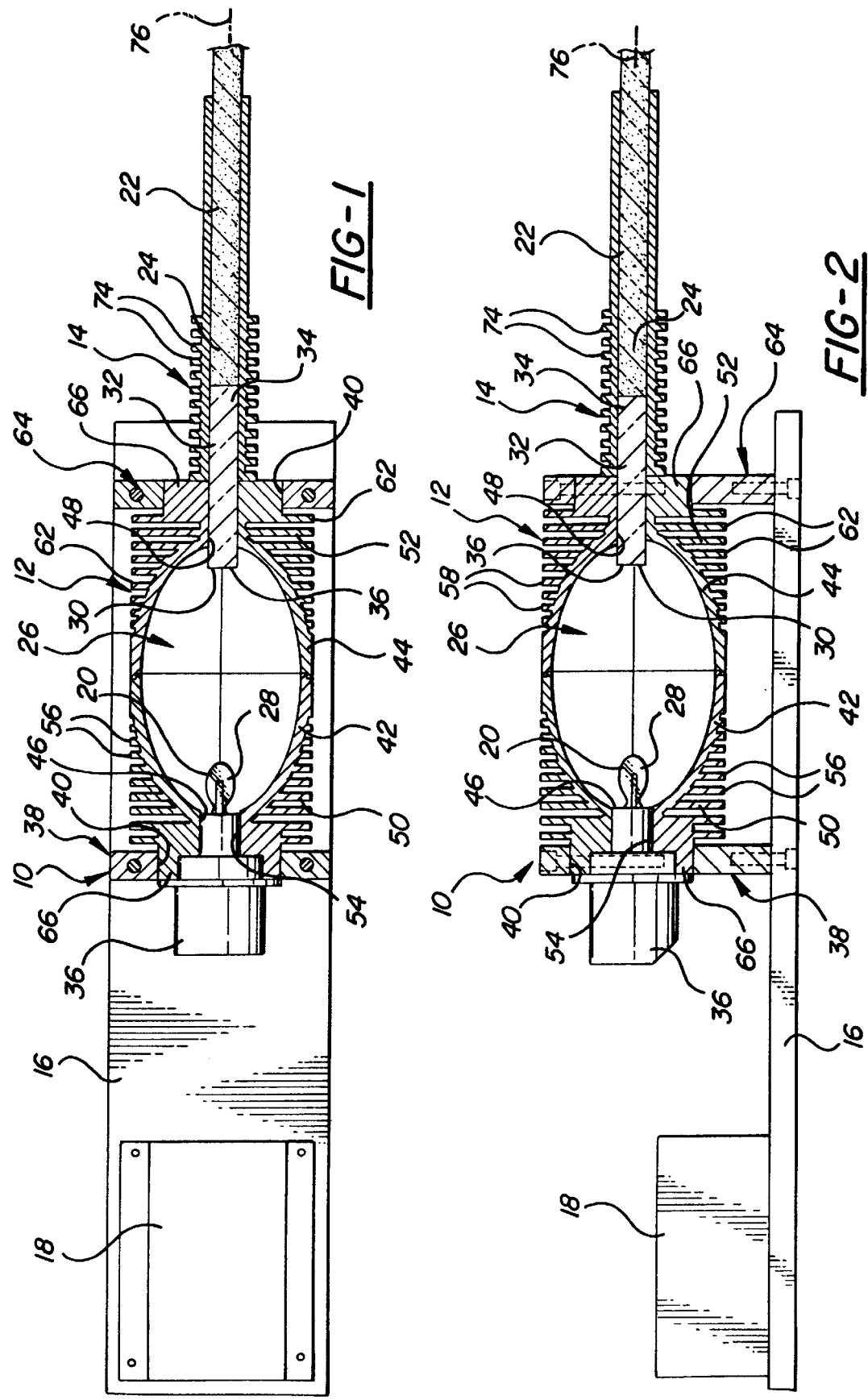

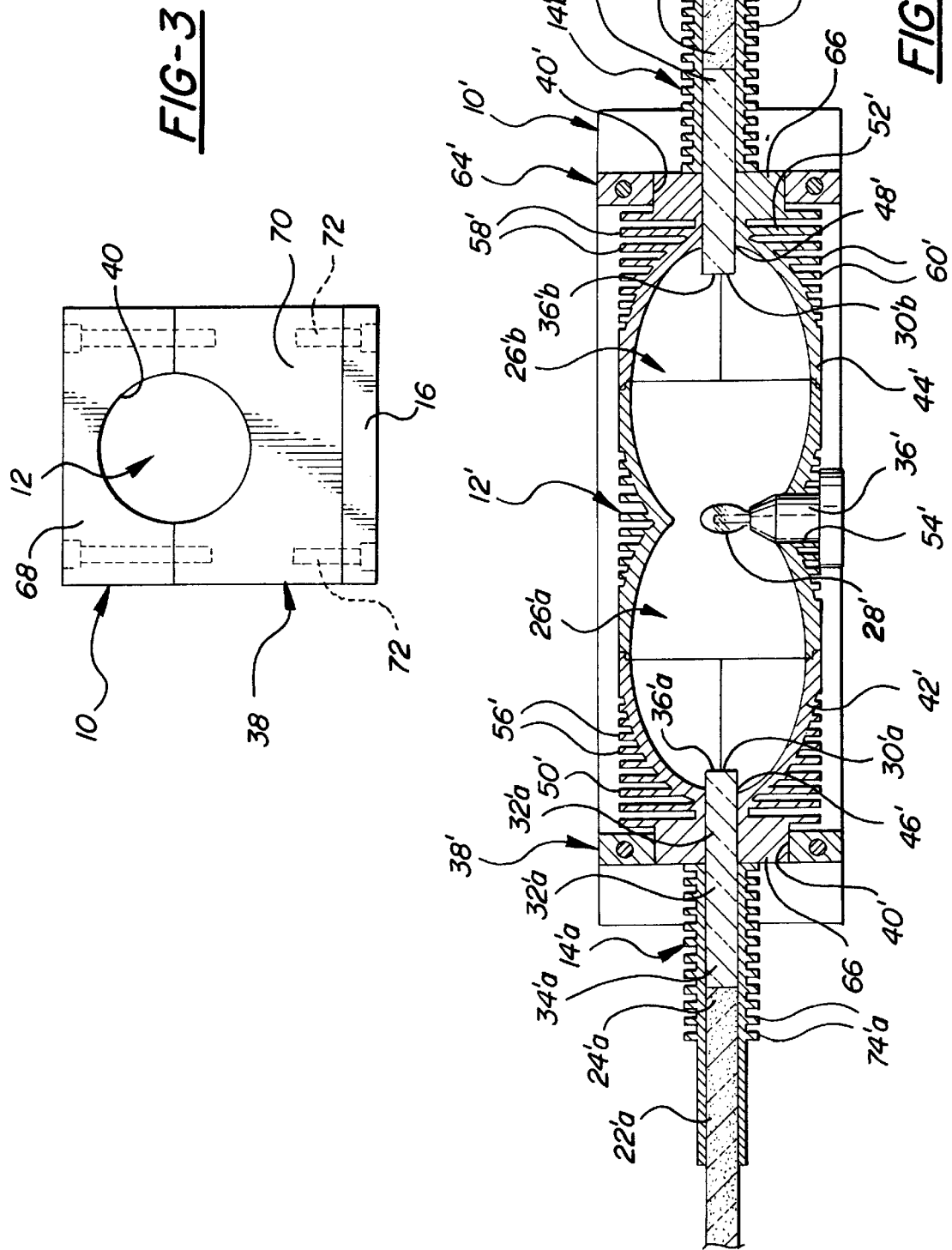

5,860,723

LIGHT ENGINE WITH ELIPSOIDAL REFLECTOR

TECHNICAL FIELD

This invention relates generally to light engines and, more specifically, to a light engine having a mirrored surface that focuses light from an emitter onto an end surface of a light pipe.

BACKGROUND OF THE INVENTION

Current light engines sometimes include reflective surfaces that collect and focus light onto end surfaces of large core optic or fiber optic light pipes. Some current systems also include means for dissipating heat and protecting light pipes from heat-related damage that might otherwise result from the intense heat typically associated with high-intensity illuminators and convergent light beams.

One method of focusing at least a portion of light from an illuminator onto a light pipe end surface is to incorporate a hollow half-ellipsoid reflector shell into a light engine. According to this method, an illuminator is disposed at a first focal point of the reflector shell and a light pipe end surface is disposed at a second focal point of the reflector shell.

For example, U.S. Pat. No. 5,099,399 to Miller et al. (the Miller patent) discloses a light engine that uses a half-ellipsoid reflector dish to focus light energy from an illuminator onto the end of a large core optic light pipe. The light engine includes a lamp casing and a tubular receptacle for receiving one end of the light pipe. The illuminator is included in a lamp disposed inside the lamp casing. A glass thermal barrier is disposed in the tubular receptacle between the lamp and the large core optic light pipe. The illuminator is disposed at a first focal point of the half-ellipsoid reflector dish. An inner surface of the thermal barrier is disposed at a second focal point of the reflector dish. The reflector dish focuses light emitted from the illuminator onto the thermal barrier inner surface.

The Miller patent also discloses a radiation heat dissipation system comprising fins and a convective heat dissipation system comprising an electric fan and a series of air channels passing through the tubular receptacle and the lamp casing. The inclusion of these various heat dissipation systems gives the Miller light engine a complex structure that is difficult to fabricate and assemble and that includes moving parts that require additional electrical energy to operate and are inherently maintenance-prone, e.g., the electric fan motor. In addition, the Miller patent discloses no provision for recovering light energy that is lost when the light energy radiates from the light source and reflects from or is absorbed by an inner surface of the lamp casing rather than reflecting off the half-ellipsoid reflector.

U.S. Pat. No. 4,883,333 to Yanez (the Yanez patent) discloses a full-ellipsoid reflector. An illuminator is disposed at a first focal point within the ellipsoid reflector. The reflector focuses light from the illuminator onto a second focal point within the ellipsoid reflector. The Yanez reflector comprises a reflective coating on a solid ellipsoid formed from optical material. The Yanez light source is embedded within the optical material.

The Yanez reflector focuses light on a lens integrally formed with a cone channel condenser. The Yanez patent discloses no provision for dissipating heat generated by the light source or for replacing the light source when it burns out. The Yanez patent also discloses no provision for protecting the light pipes from heat energy that the illuminator might generate.

U.S. Pat. No. 5,416,669 to Kato et al. (the Kato patent) discloses a light engine having two intersecting, outwardly facing half-ellipsoidal reflector dishes. A single illuminator is disposed at a point that is the first focal point of both reflector dishes. Two light pipes extend inward, from outside the light engine, through a pair of tubular receptacles to the second focal point of each reflector dish.

Glass thermal barriers are disposed in the tubular receptacles between the lamp and the large core optic light pipes. Because the reflectors are only half-ellipsoidal, much of the light from the illuminator does not impinge upon the reflectors. Therefore, the Kato light engine includes a second set of annular mirrored surfaces that re-direct light that does not impinge upon the half-ellipsoid reflector dishes. The resulting structure includes complex contours that are difficult to machine.

It is desirable for light engines that condense light onto end surfaces of large core optic light pipes to include reflective surfaces and heat dissipation systems that are both effective and relatively simple and inexpensive to manufacture and operate.

SUMMARY OF THE INVENTION

In accordance with this invention a light engine is provided that includes a generally full-ellipsoidal reflector surface that focuses light from an illuminator onto a thermal barrier that is optically coupled with a light pipe. The light engine comprises a lamp casing that includes a light pipe receptacle. The illuminator is supported within the casing and the large core optic light pipe extends from outside the light engine into the tubular receptacle. The light pipe has an inner end supported in the tubular receptacle. The generally full-ellipsoidal reflector surface is supported within the casing. The illuminator is disposed adjacent a first focal point of the ellipsoidal reflector surface. The reflector surface is positioned to focus light energy from the illuminator onto a second focal point of the ellipsoidal reflector surface. A thermal barrier is disposed in the tubular receptacle between the lamp and the light pipe inner end. The thermal barrier has an outer end surface optically coupled to the light pipe. The thermal barrier also has an inner end surface disposed adjacent the second focal point of the reflector surface to receive convergent light emitted from the illuminator and reflected from the reflector surface.

According to another aspect of the present invention the thermal barrier comprises quartz. Quartz has a morphological chemical composition that gives it properties that are significantly different from those of glass. For example, quartz has a much lower coefficient of thermal expansion than glass and is much more resistant to thermal shock. Quartz also is more transparent that glass over a wider range of electromagnetic frequencies—including the infra-red portion of the spectrum. These properties provide clear benefits to the use of quartz over glass as a light-transmitting thermal barrier.

According to another aspect of the present invention the reflector surface comprises a composite inner reflective surface of two intersecting half-ellipsoidal reflector dishes. This construction is easy to manufacture and assemble while successfully capturing a majority of light radiated from the emitter.

According to another aspect of the present invention the casing comprises the reflector surface. This reduces the number of parts required for assembling the light engine.

According to another aspect of the present invention the casing comprises a first plurality of heat dissipation fins extending outwardly of the casing adjacent the reflector. A second plurality of fins may extend outwardly from the light pipe receptacle adjacent the thermal barrier.

According to another aspect of the present invention, a light engine is provided that comprises a casing having two light pipe receptacles. In addition, two ellipsoidal reflector surfaces intersect in such a way as to share a common first focal point. A single illuminator is disposed at the common first focal point. The reflector surfaces reflect light from the illuminator onto respective second focal points of each reflector surface. Thermal barriers located adjacent each reflector surface receive the convergent light and transmit it to each of the two light pipes.

BRIEF DESCRIPTION OF THE DRAWINGS

To better understand and appreciate the invention, refer to the following detailed description in connection with the accompanying drawings:

FIG. 1 is a plan view of a light engine constructed according to a first embodiment of the present invention and mounted on a mounting plate adjacent a ballast unit;

FIG. 2 is a front view of the light engine, mounting plate and ballast of FIG. 1;

FIG. 3 is an end view of an end plate portion of the light engine of FIG. 1; and FIG. 4 is a front view of a light engine constructed according to a second embodiment of the present invention.

DETAILED DESCRIPTION OF THE PREFERRED EMBODIMENT

A first embodiment of a light engine constructed according to the present invention is generally indicated at 10 in FIGS. 1, 2 and 3. A second embodiment of this invention is generally indicated at 10' in FIG. 4 Second embodiment structures corresponding to similar structures in the first embodiment are identified with primed numerals in the following description and the associated drawings. Second embodiment structures that are identical to corresponding structures in the first embodiment carry the same numerals as the first embodiment structures.

As shown in FIGS. 1 and 2, the light engine 10 comprises a lamp casing 12 that includes a tubular light pipe receptacle 14. The light engine 10 is shown mounted on a rectangular mounting plate 16 adjacent a ballast unit 18. In other embodiments the light engine 10 may be mounted to any other suitable structure, may be located remote from the ballast unit 18 or may be designed to operate without a ballast unit 18.

An illuminator, shown at 20 in FIGS. 1 and 2, is supported within the casing 12 and a large core optic light pipe 22 extends from outside the light engine 10 into the tubular receptacle 14. The light pipe 22 has an inner end 24 supported in the tubular receptacle 14. A full-ellipsoidal reflector surface, generally indicated at 26 in FIGS. 1 and 2, is supported within the casing 12. The illuminator 20 is disposed adjacent a first focal point 28 of the ellipsoidal reflector surface 26. The reflector surface 26 is supported in a position to focus light energy from the illuminator 20 onto a second focal point 30 of the ellipsoidal reflector surface 26.

A thermal barrier, shown at 32 in FIGS. 1 and 2, is disposed in the tubular receptacle 14 between the illuminator 28 and the light pipe inner end 24. The thermal barrier 32 has an outer end 34 optically coupled to the light pipe 22 and an inner end surface 36 disposed adjacent the second focal point 30 of the reflector surface 26 to receive convergent light emitted from the illuminator 20 and reflected from the reflector surface 26.

The illuminator 20 may be a quartz-halogen or a metal halide lamp such as that described in U.S. Pat. No. 4,704,660 granted Nov. 3, 1987 to Robbins et al and incorporated herein by reference. Such illuminators are available from General Electric Company and Lumenyte International Corporation.

As shown in FIGS. 1 and 2, the illuminator 20 is supported in a lamp fixture 36. The lamp fixture 36 is supported on a first end plate 38 of the casing 12 and extends into the casing 12 through an aperture 40 in the first end plate 38.

The thermal barrier 32 preferably comprises a quartz cylinder although it may comprise any one of a number of substances having sufficient transparency and favorable heat transfer characteristics. In other embodiments, the thermal barrier 32 may have any one of a number of different suitable shapes as may be appropriate for particular applications.

The reflector surface 26 is a composite surface formed by joining together the mirrored inner surfaces of two intersecting half-ellipsoidal reflector dishes 42, 44. The general shape of the composite reflector surface 26 is that of a full ellipsoid. In other words, the reflector surface 26 has the general shape of a full ellipsoid with the only discontinuities being two reflector surface apertures 46, 48 that extend through the reflector surface 26.

As shown in FIGS. 1 and 2, first 46 and second 48 reflector surface apertures are disposed through respective first and second diametrically opposite ends of the ellipsoidal reflector surface 26 at respective first 50 and second 52 ends of the lamp casing 12. The first reflector surface aperture 46 aligns axially with and is disposed adjacent a tubular lamp receptacle 54 disposed through the casing 12. This tubular lamp receptacle 54 accommodates the lamp fixture 36 that supports and provides electrical power to the illuminator 20.

The second reflector surface aperture 48 aligns axially with and is disposed adjacent the tubular light pipe receptacle 14. The light pipe receptacle 14 has the shape of an elongated tube and extends integrally and axially outward from the second end 52 of the casing 12.

The reflector dishes 42, 44 are included with and formed as part of the casing 12. Therefore, the reflector surface 26 lines an interior surface of an ellipsoidal chamber defined by the jointed reflector dishes 42, 44 within the casing 12.

As shown in FIGS. 1 and 2, the casing 12 comprises heat dissipation fins 56 that extend integrally and radially outward from adjacent the reflector surface 26. Each fin 56 has a generally square planar shape defined by a top 58, a bottom 60 and two side 62 peripheral outer edges of each fin 56. The outer peripheral dimensions and shapes of each fin 56 are generally identical. The fins 56 are arranged parallel to one another and are evenly spaced apart between the first end plate 38 and an identical second end plate 64.

As is representatively shown in FIG. 3, the end plates 38, 64 are of identical shape and size. Each end plate 38, 64 has peripheral top, bottom and side edges describing a generally rectangular outer shape. A circular aperture 40 passes through each end plate 38, 64 and is sized to receive cylindrical end protrusions 66 that extend integrally and axially outward from opposite axial ends of the casing 12. As is best shown in FIG. 3, each end plate 38, 64 includes rectangular top 68 and bottom 70 portions that bolt together into a clamped position around the casing end protrusions 66. Two bolts 72 extend upward through holes in the mounting plate 16 and threadedly engage holes disposed in the bottom edge of each end plate 38, 64 to secure each end plate 38, 64 to the mounting plate 16.

The fins 56 are disposed such that their top 58 and side 62 peripheral outer edges are aligned with top and side peripheral outer edges of the end plates 38, 64 to form the general shape of a rectangular prism or block.

Centrally disposed through each fin 56 is a circular aperture. The apertures of each fin 56 are not identical in size, but, rather, have diameters of graduated sizes that correspond to the outer diameter of the casing 12 at the point where each respective fin 56 is supported on the casing 12. In other embodiments the fins 56 may have any one of a number of suitable shapes and configurations other than those shown in the drawings and described above.

A portion of the tubular light pipe receptacle 14 extends axially outward from the second end plate 64. Spaced along the length of the light pipe receptacle 14 are a second plurality of heat dissipation fins 74. Each fin of the second plurality of heat dissipation fins 74 is circular and planar in shape and extends outwardly from around an outer circumferential surface of the light pipe receptacle 14 adjacent the thermal barrier 32. The second plurality of fins 74 are aligned parallel with each other and perpendicular to a central axis 76 of the light pipe 22 receptacle 14.

A light engine 10 constructed according to the present invention is simple in structure, easy to fabricate and assemble and includes no moving parts that require additional electrical energy and maintenance to operate. As a specific example, a light engine 10 constructed using according to the present invention and using a quartz rather than a glass thermal barrier would require no electric fan motor. In addition, the full-ellipsoidal configuration of the reflector surface 26 directs practically all the light energy emitted by the illuminator 20 into the light pipe 22. In other systems, a significant amount of light energy is lost or attenuated when it fails to reflect from an ellipsoidal surface and, instead, either reflects off of or is absorbed by another surface.

A light engine constructed according to the second embodiment of the present invention is shown at 10' in FIG. 4. The casing 12' of the second embodiment includes two tubular light pipe receptacles 14'a, 14'b rather than a single light pipe receptacle 14 as in the first embodiment described above. In addition, first 26'a and second 26'b intersecting ellipsoidal reflector surfaces are supported within the casing 12'. These intersecting reflector surfaces 26'a, 26'b share a common first focal point 28'. A single illuminator 20 is disposed within the casing 12' adjacent the common first focal point 28'. A first light pipe 22'a extends from outside the light engine 10' through a first one 14'a of the two light pipe receptacles 14'a, 14'b to a second focal point 30'a of the first reflector surface 26'a. Likewise, a second light pipe 22'b extends from outside the light engine 10' through a second one 14'b of the two light pipe receptacles 14'a, 14'b to a second focal point 30'b of the second reflector surface 26'b. First 32'a and second 32'b quartz thermal barriers are supported in the first 14'a and second 14'b tubular receptacles, respectively. The first thermal barrier 32'a is, therefore, disposed between the illuminator 20 and the first light pipe 22'a and the second thermal barrier 32'b is disposed between the illuminator 20 and the second light pipe 22'b.

Similar to the light engine 10 of the first embodiment, the casing 12' of the light engine 10' of the second embodiment comprises the reflector surfaces 26'a, 26'b. As in the first embodiment, the casing 12' of the second embodiment comprises heat dissipation fins 56' that extend integrally outward from the tubular light pipe receptacles 14'a, 14'b and the reflector dishes 42', 44' adjacent the reflector surfaces 26'a, 26'b.

Unlike prior art systems, a light engine 10' constructed according to this second embodiment of the present invention does not require that an additional set of annular mirrored surfaces be fabricated to re-direct light that does not impinge upon its reflector dishes 42', 44'. Rather, a simple, easy-to-machine double-elliptical chamber captures and directs light from the illuminator 20 to the two light pipes 22'a, 22'b.

We intend the above to illustrate two embodiments of the present invention by using descriptive rather than limiting words. Obviously, there are many ways that one might modify these embodiments while remaining within the scope of the claims. In other words, there are many other ways that one may practice the present invention without exceeding the scope of the claims.

We claim:

1. A light engine comprising:
    a lamp casing including a light pipe receptacle;
    an illuminator supported within said casing;
    a light pipe extending from outside said light engine into said light pipe receptacle, said light pipe having an inner end supported in said light pipe receptacle;
    a full-ellipsoidal reflector surface supported within said casing, said illuminator disposed adjacent a first focal point of said ellipsoidal reflector surface, said reflector surface positioned to focus light energy from said illuminator onto a second focal point of said ellipsoidal reflector surface; said reflector surface including a reflector surface aperture between the second focal point and the light pipe inner end, the aperture configured to provide a path for said light energy to escape from within said ellipsoidal reflector surface; and
    a thermal barrier disposed in said tubular receptacle and extending through said aperture between said second focal point and said light pipe inner end, said thermal barrier having an outer end surface optically coupled to said light pipe and an inner end surface disposed adjacent said second focal point of said reflector surface to receive convergent light emitted from said illuminator and reflected from said reflector surface.

2. A light engine as defined in claim 1 in which said thermal barrier comprises quartz.

3. A light engine as defined in claim 1 in which said full-ellipsoidal reflector surface comprises a composite inner reflective surface of two intersecting half-ellipsoidal reflector dishes.

4. A light engine as defined in claim 1 in which said casing comprises said reflector surface.

5. A light engine as defined in claim 4 in which said casing comprises a first plurality of heat dissipation fins extending outwardly of said casing adjacent said reflector surface.

6. A light engine as defined in claim 1 further including a second plurality of heat dissipation fins extending outwardly from said receptacle adjacent said thermal barrier.

7. A light engine comprising:
    a casing including two light pipe receptacles;
    first and second intersecting full-ellipsoidal reflector surfaces supported within said casing and having a common first focal point;
    a single illuminator disposed within said casing adjacent said common first focal point;

a first light pipe extending from outside said light engine into one of said receptacles;

a second light pipe extending from outside said light engine into the other of said receptacles;

said reflector surfaces each including a reflector surface aperture between an inner end of each light pipe and respective second focal points of each reflector surface, the apertures configured to provide paths for said light energy to escape from within said respective ellipsoidal reflector surfaces;

a thermal barrier supported in at least one of said light pipe receptacles and extending through said aperture between one of said light pipes and said second focal point of one of said first and second reflector surfaces.

8. A light engine as defined in claim 7, in which said thermal barrier comprises quartz.

9. A light engine as defined in claim 7 in which said casing comprises said reflector surfaces.

10. A light engine as defined in claim 9 in which said casing comprises a first plurality of heat dissipation fins extending outwardly of said casing adjacent said reflector surface.

11. A light engine as defined in claim 7 further including a second plurality of heat dissipation fins extending outwardly from said receptacle adjacent said thermal barrier.

* * * * *